United States Patent [19]

Gharavi

[11] Patent Number: 4,578,704

[45] Date of Patent: Mar. 25, 1986

[54] IMAGE CODING TECHNIQUE

[75] Inventor: Hamid Gharavi, Middletown, N.J.

[73] Assignee: AT&T Bell Laboratories, Murray Hill, N.J.

[21] Appl. No.: 505,885

[22] Filed: Jun. 20, 1983

[51] Int. Cl.$^4$ .......................... H04N 7/12; H04N 1/40; H04N 1/417; H04N 1/419

[52] U.S. Cl. .................................. 358/135; 358/260; 358/261

[58] Field of Search ............... 358/135, 260, 261, 133, 358/136; 375/27, 31

[56] References Cited

U.S. PATENT DOCUMENTS

| | | | |
|---|---|---|---|
| 3,813,485 | 5/1974 | Arps | 358/261 |
| 4,121,259 | 10/1978 | Preuss et al. | 358/261 |
| 4,325,085 | 4/1982 | Gooch | 358/260 |
| 4,363,036 | 12/1982 | Subramaniam | 358/261 |
| 4,420,771 | 12/1983 | Pirsch | 358/261 |

OTHER PUBLICATIONS

"Binary Image Compression", *Image Transmission Techniques*, R. B. Arps, 1979, pp. 219–276.
"Picture Coding: A Review", *Proc. of IEEE*, vol. 68, No. 3, A. N. Netravali, Mar. 1980, pp. 366–406.
"Ordering Techniques for Facsimile Coding: A Review", *Proc. of IEEE*, vol. 68, No. 7, A. N. Netravali and F. W. Mounts, Jul. 1980, pp. 796–807.

*Primary Examiner*—Douglas W. Olms
*Assistant Examiner*—Wellington Chin
*Attorney, Agent, or Firm*—Ronald D. Slusky

[57] ABSTRACT

In a first embodiment, an image signal is segmented into bilevel and multilevel regions. The picture elements, or pels, representing the bilevel regions are center-thresholded and encoded using a two-dimensional CCITT coding scheme. The pels representing the multilevel regions are coded in a differential pulse code modulation (DPCM) coder. The resulting DPCM errors are coded by an intermediate coder which assigns the $i^{th}$ one of an ordered plurality of codewords to represent each pel whose value is the $i^{th}$ most-frequently-expected to occur, given the values of predetermined ones of the neighbor pels. The intermediate codeword values are assigned such that the intermediate coder output stream contains long bit runs. That output stream is then run- and variable-length coded in accordance with a one-dimensional CCITT bilevel image coding scheme. In a second embodiment, 3-bit DPCM words are coded by assigning a variable length codeword to represent each pel a a function of its expected frequency of occurrence given the neighbor pel values.

28 Claims, 8 Drawing Figures

C = CURRENT PEL
A = NEIGHBOR A
B = NEIGHBOR B
X = OTHER PELS IN 5-BY-5 WINDOW
− = OTHER PELS NOT IN 5-BY-5 WINDOW

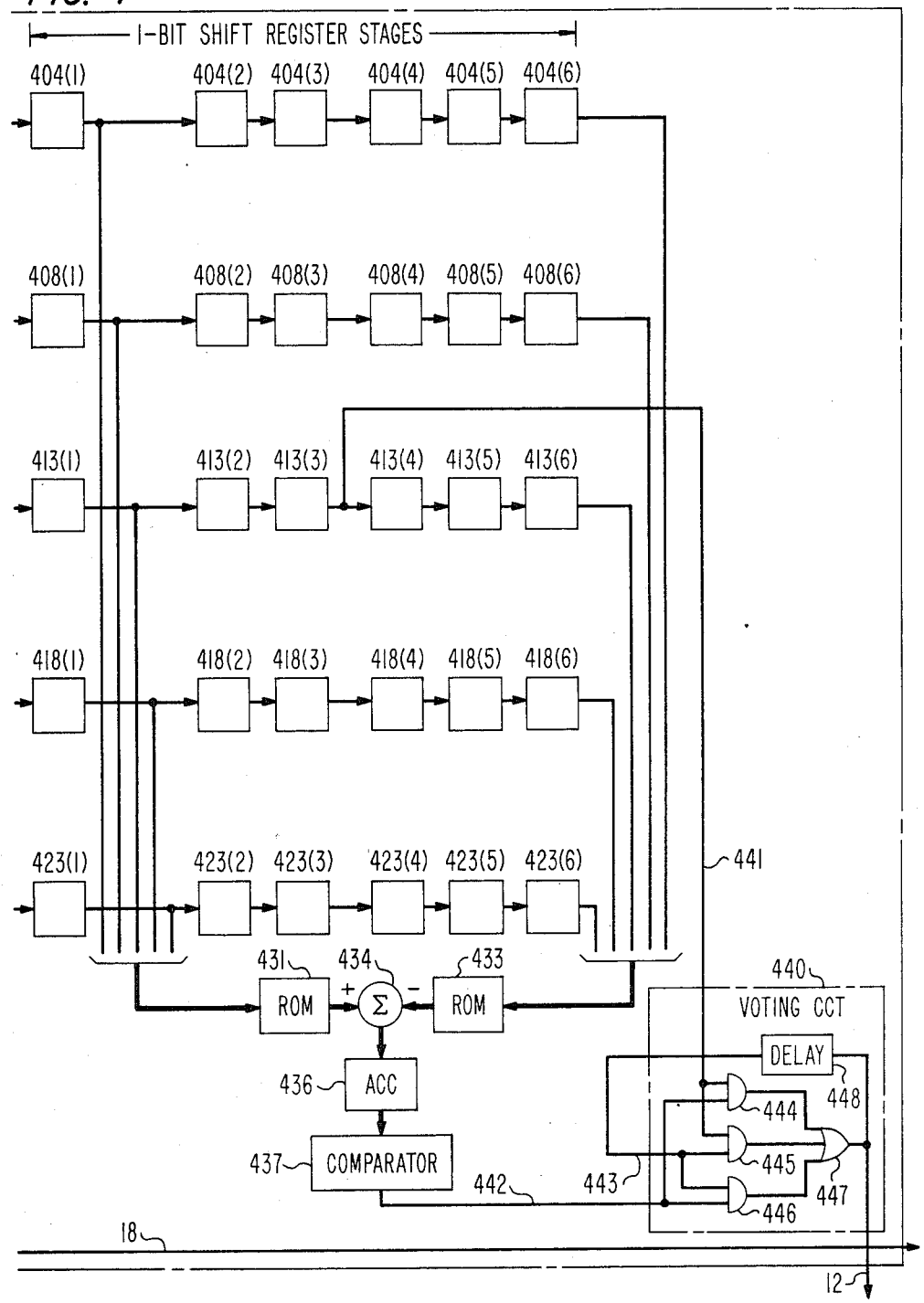

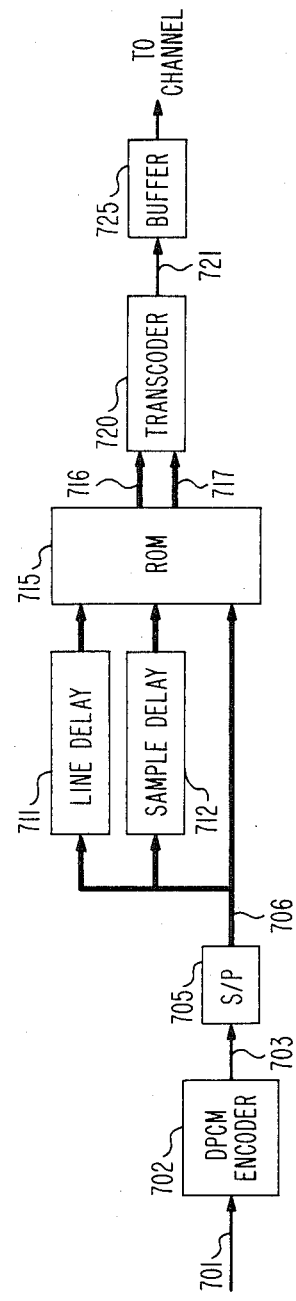
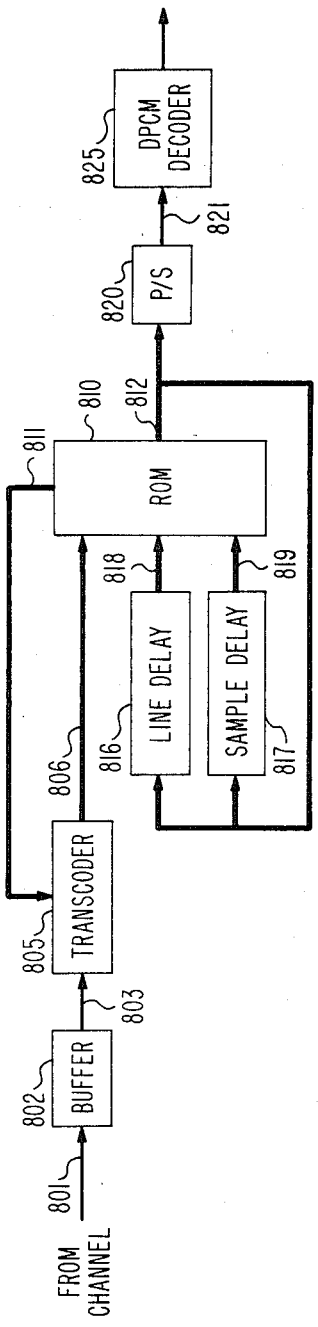

IMAGE CODING TECHNIQUE

BACKGROUND OF THE INVENTION

The invention relates to systems for encoding pictorial information.

In is conventional in systems which transmit and/or store pictorial information, or images, to encode the images in such a way as to remove the redundancies therein. This approach minimizes the time required to transmit the image over a channel of given bandwidth or, equivalently, the amount of bandwidth required to transmit an image within a given time. It also minimizes the amount of memory required to store an image.

SUMMARY OF THE INVENTION

The present invention is directed to such an image encoding technique. In accordance with the invention, an ensemble of image signals of desired type are analyzed to determine the order of frequency with which a value associated with each picture element, or pel, occurs as a function of the values of predetermined ones of its neighbor pels. The $i^{th}$ one of an ordered plurality of codewords is then assigned to represent each pel whose value is the $i^{th}$ most-frequently-expected to occur, given the neighbor state, i.e., given the values of the predetermined neighbors.

Depending on how the codeword values are selected, the above-described coding scheme can result in a new image signal which, for example, either (a) will itself efficiently represent the image, or (b) which can be further processed to that end. As an example of (a), a variable-length coding scheme can be used wherein the pel values that are expected to occur most frequently given the neighbor state are assigned to the shortest code word values in accordance, for example, with conventional values in accordance, for example, with conventional Huffman coding tecniques. As an example of (b), a fixed-length coding scheme can be used wherein the code words are assigned in such a way as to provide a signal which has long bit runs. Such a signal could then be efficiently run-length-coded.

BRIEF DESCRIPTION OF THE DRAWING

In the drawing,

FIG. 2 is a pel map helpful in explaining the operation of the transmitter of FIG. 1;

FIGS. 3 and 4, when arranged as shown in FIG. 5, comprise a block diagram of a segmentor used in the transmitter of FIG. 1;

FIG. 7 is a block diagram of another transmitter embodying the principles of the invention, and FIG. 8 is a block diagram of a receiver embodying the principles of the invention which processes the signal generated by the transmitter of FIG. 7.

DETAILED DESCRIPTION

Figure 1:
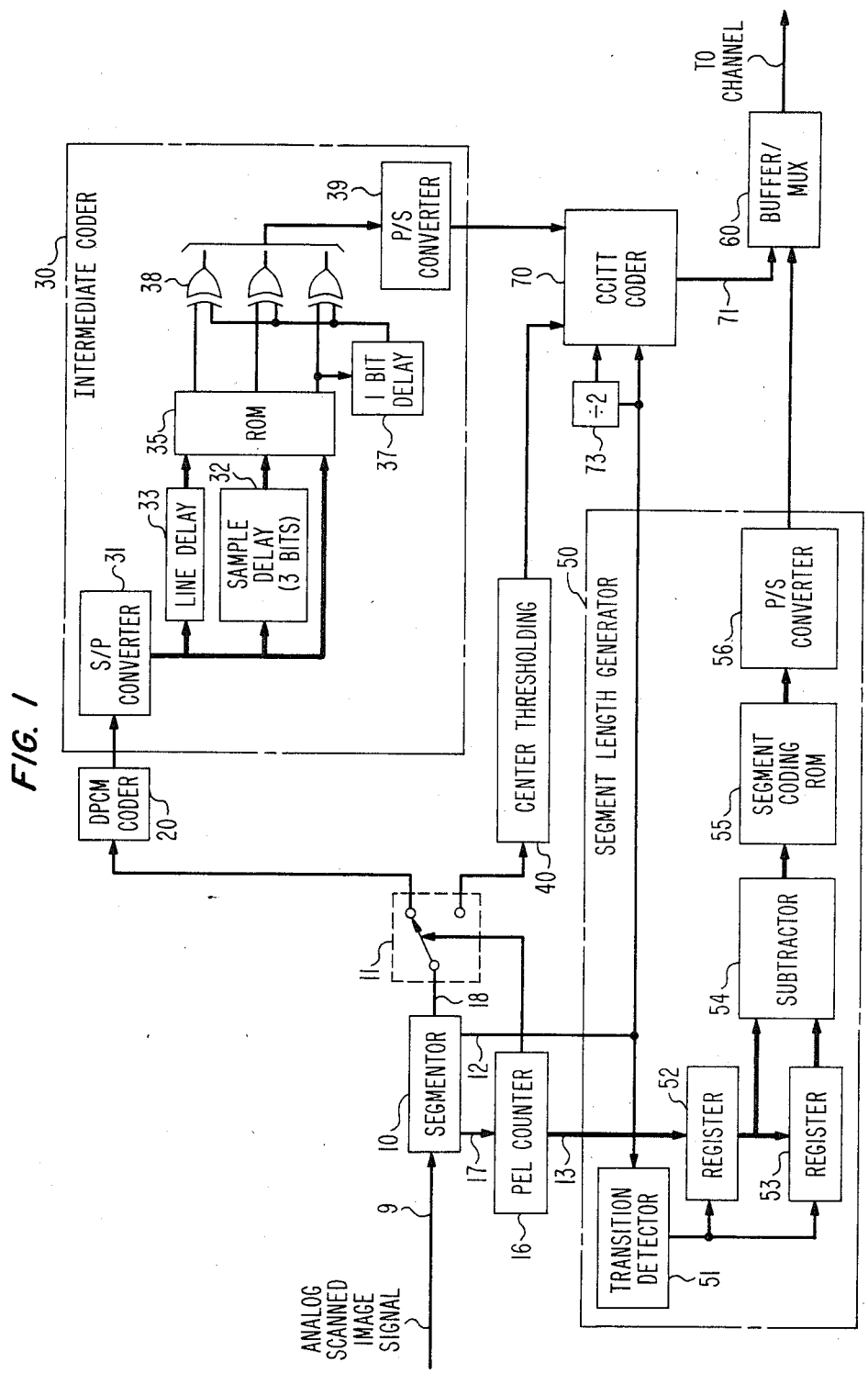
FIG. 1 is a block diagram of a transmitter embodying the principles of the invention.

The transmitter of FIG. 1 receives on lead 9 an analog image signal representing an image which contains both bilevel and multilevel regions. The image signal may have been generated, for example, by a conventional video scanner (not shown). Within the transmitter, the image signal is applied to a segmentor 10. As described more fully below, the function of the segmentor is to (a) digitize the received signal into picture elements, or pels, having values quantized to within the range 0–255, and (b) determine whether the current pel is from a region of the scanned image that is bilevel or multilevel.

Assume, in particular, that segmentor 10 determines that the current pel is from a bilevel region. In that case, the segmentor operates switch 11 via a signal on lead 12 so as to apply the bits which represent the pel value to center thresholding circuit 40 via lead 18. Center thresholding circuit 40 makes a determination as to whether the curent pel represents a "0" or a "1"—depending on whether its value is greater or less than a predetermined threshold—in this example 128—and applies the appropriate bit value to CCITT coder 70. The latter also receives the signal on lead 12, its current value indicating that the current pel is from a bilevel region of the image. This indicates to coder 70 that it is to code the current pel utilizing the two-dimensional CCITT code specified in the CCITT Recommendation "Standardization of Group 3 Facsimile Apparatus for Document Transmission," Vol. III, Fascicle VII.2, Rec. T.4.

On the other hand, segmentor 10 may determine that the current pel is from a multilevel region of the image. In that case, the signal on lead 12 operates switch 11 so as to route the imge signal to differential pulse code modulation (DPCM) coder 20. The latter operates in conventional fashion to generate a stream of DPCM error values each associated with a respective pel of the image. In this example, the DPCM error values can take on one of seven values.

At the same time, the value of the signal on lead 12 indicates to coder 70 that it is now to encode its input by first run-length coding same and then coding the resulting run lengths using the one-dimensional variable length code specified in the aforementioned CCITT recommendation. In order to enhance the efficiency of the run-length-coding process, the DPCM errors generated by coder 20, before being applied to CCITT coder 70, are first applied to intermediate coder 30 which, as will be described below, re-codes the DPCM errors in accordance with the present invention, to generate a stream of binary codewords whose average bit run length is greater than that of the stream of DPCM error values.

The output of coder 70 is a stream of codewords which is applied to buffer/multiplexer 60. The latter also receives, from segment length generator 50, a stream of words, or "segment lengths" associated with each line of the scanned image, alternate ones of the segment lengths representing the lengths (in pels) of the bilevel and multilevel regions of the line in question. Buffer/multiplexer 60 stores the codewords and segment lengths associated with each line as they are generated by coder 70 and generator 50, respectively, and then applies to the transmission channel first the segment lengths associated with the line in question and then the codewords associated therewith. The segment lengths are used in the receiver to determine which portion of the codeword stream was generated using the one-dimensional coding scheme and which was generated using the two-dimensional coding scheme.

Segment length generator 50, more particularly, receives two inputs. One of the inputs is a pel count—a multibit word which indicates the position of the current pel in the current line. The pel count is provided from a pel counter 16 on a cable 13 which extends to parallel in/parallel out register 52 within generator 50. The other input to generator 50 is the signal on lead 12 which, it will be remembered, indicates whether the current pel comes from a bilevel or multilevel region of the image.

More particularly, lead 12 extends within generator 50 to transition detector 51, which responds to each transition on lead 12 by applying a pulse to register 52 and also to a second parallel in/parallel out register 53, which receives its input from the output of register 52.

In operation, each transition on lead 12—which indicates that the current pel is the first pel of a new segment, i.e., is at either a bilevel/multilevel or multilevel/bilevel transition point—causes the pel address of the beginning (end) of the previous segment to be loaded into register 53 (52). The difference between these two addresses, which represents the length of that segment, is formed by subtractor 54 and that difference is applied to a segment length encoding ROM 55. The code embedded in the latter may be of any convenient type. The output of ROM 55 is then converted to a serial bit stream by parallel-to-serial converter 56, that bit stream then being applied to buffer/multiplexer 60 as mentioned above.

In order for CCITT coder 70 to implement the above-mentioned two-dimensional code, it must be provided with the address of the first pel in each bilevel segment of each line. To this end coder 70 further receives the output of divide-by-two circuit 73, the latter receiving its input from lead 12. Each output pulse of circuit 73 indicates to coder 70 that the current pel is the first one of a new bilevel segment.

As previously noted, the function of intermediate coder 30 is to re-code, in accordance with the invention, the DPCM errors provided by DPCM coder 20 such that the resulting bit stream contains, on average, longer bit runs than does the DPCM coder output. The particular way in which the re-coding is carried out will now be described, followed by a description of how the circuitry within intermediate coder 30 actually performs this re-coding.

In accordance with the invention, the intermediate code is arrived at by first determining, for an ensemble of image signals of a desired type—in this example signals representing DPCM-coded multilevel images—the order statistics for each possible pel value, i.e., the order of frequency with which each possible pel value occurs, given the values of predetermined ones of its neighbor pels. The $i^{th}$ one of an ordered plurality of intermediate codewords is then assigned to represent each pel whose value is the $i^{th}$ most-frequently-expected to occur, given the neighbor state, i.e., given the values of the predetermined neighbors. In this way, a codeword is generated for each pel as a function of the frequency with which its associated value is expected to occur given the neighbor state, i.e., as a function of the value associated with the pel and of the expected order statistics.

In this embodiment, the ordered plurality of intermediate codewords is the same for each neighbor state (although in the embodiment shown in FIGS. 7 and 8 as discussed below, this need not be so). Accordingly, if the ensemble of images that was used to design the code is in fact representative of DPCM-encoded multilevel images generally, then the first codeword can be expected to be the one that the coder will generate the most often, the second codeword can be expected to be the one that the coder will generate the second most often, and so forth. Given this relationship, an appropriate assignment of particular bit patterns to the intermediate codewords will result, as desired, in long bit runs.

Consider, as an example, the following table of codewords constructed in accordance with the invention.

TABLE I

| NEIGHBOR STATE | NEIGHBORS B | NEIGHBORS A | CODEWORDS $W_1$ 000 | $W_2$ 001 | $W_3$ 011 | $W_4$ 111 | $W_5$ 110 | $W_6$ 100 | $W_7$ 010 |
|---|---|---|---|---|---|---|---|---|---|
| 1 | $L_1$ | $L_1$ | $L_1$ | $L_2$ | $L_3$ | $L_4$ | $L_5$ | $L_6$ | $L_7$ |
| 2 | $L_1$ | $L_2$ | $L_1$ | $L_2$ | $L_3$ | $L_4$ | $L_5$ | $L_6$ | $L_7$ |
| 3 | $L_1$ | $L_3$ | $L_1$ | $L_3$ | $L_2$ | $L_5$ | $L_4$ | $L_6$ | $L_7$ |
| 4 | $L_1$ | $L_4$ | $L_2$ | $L_1$ | $L_4$ | $L_3$ | $L_7$ | $L_5$ | $L_6$ |
| 5 | $L_1$ | $L_5$ | $L_3$ | $L_5$ | $L_1$ | $L_2$ | $L_6$ | $L_4$ | $L_7$ |
| 6 | $L_1$ | $L_6$ | $L_5$ | $L_6$ | $L_3$ | $L_2$ | $L_7$ | $L_1$ | $L_4$ |
| 7 | $L_1$ | $L_7$ | $L_7$ | $L_4$ | $L_2$ | $L_6$ | $L_5$ | $L_3$ | $L_1$ |
| 8 | $L_2$ | $L_1$ | $L_1$ | $L_3$ | $L_2$ | $L_4$ | $L_5$ | $L_7$ | $L_6$ |
| 9 | $L_2$ | $L_2$ | $L_1$ | $L_2$ | $L_3$ | $L_4$ | $L_5$ | $L_7$ | $L_6$ |
| 10 | $L_2$ | $L_3$ | $L_3$ | $L_1$ | $L_2$ | $L_5$ | $L_4$ | $L_6$ | $L_7$ |
| 11 | $L_2$ | $L_4$ | $L_2$ | $L_4$ | $L_1$ | $L_3$ | $L_7$ | $L_5$ | $L_6$ |
| 12 | $L_2$ | $L_5$ | $L_3$ | $L_5$ | $L_1$ | $L_2$ | $L_6$ | $L_4$ | $L_7$ |
| 13 | $L_2$ | $L_6$ | $L_6$ | $L_5$ | $L_7$ | $L_3$ | $L_4$ | $L_1$ | $L_2$ |
| 14 | $L_2$ | $L_7$ | $L_7$ | $L_5$ | $L_4$ | $L_6$ | $L_2$ | $L_3$ | $L_5$ |
| 15 | $L_3$ | $L_1$ | $L_1$ | $L_2$ | $L_3$ | $L_4$ | $L_5$ | $L_6$ | $L_7$ |
| 16 | $L_3$ | $L_2$ | $L_1$ | $L_2$ | $L_3$ | $L_4$ | $L_5$ | $L_7$ | $L_6$ |
| 17 | $L_3$ | $L_3$ | $L_1$ | $L_3$ | $L_2$ | $L_5$ | $L_4$ | $L_6$ | $L_7$ |
| 18 | $L_3$ | $L_4$ | $L_2$ | $L_1$ | $L_4$ | $L_3$ | $L_7$ | $L_5$ | $L_6$ |
| 19 | $L_3$ | $L_5$ | $L_3$ | $L_1$ | $L_5$ | $L_2$ | $L_6$ | $L_4$ | $L_7$ |
| 20 | $L_3$ | $L_6$ | $L_6$ | $L_5$ | $L_3$ | $L_2$ | $L_1$ | $L_7$ | $L_4$ |
| 21 | $L_3$ | $L_7$ | $L_7$ | $L_6$ | $L_5$ | $L_3$ | $L_2$ | $L_4$ | $L_1$ |
| 22 | $L_4$ | $L_1$ | $L_3$ | $L_1$ | $L_2$ | $L_5$ | $L_4$ | $L_7$ | $L_6$ |
| 23 | $L_4$ | $L_2$ | $L_2$ | $L_1$ | $L_3$ | $L_4$ | $L_5$ | $L_7$ | $L_6$ |
| 24 | $L_4$ | $L_3$ | $L_3$ | $L_1$ | $L_5$ | $L_2$ | $L_4$ | $L_7$ | $L_6$ |
| 25 | $L_4$ | $L_4$ | $L_4$ | $L_2$ | $L_1$ | $L_7$ | $L_3$ | $L_5$ | $L_6$ |
| 26 | $L_4$ | $L_5$ | $L_5$ | $L_3$ | $L_1$ | $L_2$ | $L_6$ | $L_4$ | $L_7$ |
| 27 | $L_4$ | $L_6$ | $L_7$ | $L_7$ | $L_5$ | $L_4$ | $L_2$ | $L_3$ | $L_7$ |
| 28 | $L_4$ | $L_7$ | $L_7$ | $L_4$ | $L_2$ | $L_3$ | $L_6$ | $L_1$ | $L_5$ |
| 29 | $L_5$ | $L_1$ | $L_2$ | $L_1$ | $L_3$ | $L_4$ | $L_5$ | $L_6$ | $L_7$ |
| 30 | $L_5$ | $L_2$ | $L_2$ | $L_1$ | $L_2$ | $L_4$ | $L_3$ | $L_5$ | $L_6$ | $L_7$ |
| 31 | $L_5$ | $L_3$ | $L_3$ | $L_1$ | $L_2$ | $L_5$ | $L_4$ | $L_6$ | $L_7$ |
| 32 | $L_5$ | $L_4$ | $L_4$ | $L_2$ | $L_7$ | $L_1$ | $L_3$ | $L_5$ | $L_6$ |
| 33 | $L_5$ | $L_5$ | $L_5$ | $L_3$ | $L_6$ | $L_1$ | $L_2$ | $L_4$ | $L_7$ |
| 34 | $L_5$ | $L_6$ | $L_6$ | $L_5$ | $L_3$ | $L_1$ | $L_2$ | $L_7$ | $L_4$ |
| 35 | $L_5$ | $L_7$ | $L_6$ | $L_7$ | $L_4$ | $L_5$ | $L_2$ | $L_1$ | $L_3$ |
| 36 | $L_6$ | $L_1$ | $L_1$ | $L_6$ | $L_7$ | $L_3$ | $L_2$ | $L_5$ | $L_4$ |
| 37 | $L_6$ | $L_2$ | $L_6$ | $L_7$ | $L_2$ | $L_4$ | $L_5$ | $L_1$ | $L_3$ |
| 38 | $L_6$ | $L_3$ | $L_1$ | $L_6$ | $L_2$ | $L_4$ | $L_1$ | $L_7$ | $L_4$ |
| 39 | $L_6$ | $L_4$ | $L_7$ | $L_6$ | $L_4$ | $L_2$ | $L_1$ | $L_3$ | $L_5$ |
| 40 | $L_6$ | $L_5$ | $L_5$ | $L_6$ | $L_3$ | $L_1$ | $L_2$ | $L_4$ | $L_7$ |
| 41 | $L_6$ | $L_6$ | $L_6$ | $L_5$ | $L_3$ | $L_7$ | $L_1$ | $L_4$ | $L_2$ |
| 42 | $L_6$ | $L_7$ | $L_6$ | $L_7$ | $L_5$ | $L_4$ | $L_2$ | $L_3$ | $L_1$ |
| 43 | $L_7$ | $L_1$ | $L_7$ | $L_5$ | $L_3$ | $L_4$ | $L_6$ | $L_2$ | $L_1$ |
| 44 | $L_7$ | $L_2$ | $L_7$ | $L_2$ | $L_3$ | $L_4$ | $L_1$ | $L_5$ | $L_6$ |
| 45 | $L_7$ | $L_3$ | $L_7$ | $L_5$ | $L_6$ | $L_4$ | $L_3$ | $L_1$ | $L_2$ |
| 46 | $L_7$ | $L_4$ | $L_4$ | $L_7$ | $L_2$ | $L_3$ | $L_1$ | $L_6$ | $L_5$ |
| 47 | $L_7$ | $L_5$ | $L_7$ | $L_6$ | $L_5$ | $L_3$ | $L_4$ | $L_2$ | $L_1$ |
| 48 | $L_7$ | $L_6$ | $L_7$ | $L_6$ | $L_4$ | $L_5$ | $L_2$ | $L_3$ | $L_1$ |
| 49 | $L_7$ | $L_7$ | $L_7$ | $L_4$ | $L_1$ | $L_2$ | $L_3$ | $L_6$ | $L_5$ |

Table I was constructed by analyzing for each pel in a representative ensemble of DPCM-encoded multilevel images the frequency of occurrence of seven possible DPCM error values—0, 6, −6, 17, −17, 40, −40 represented as $L_1$ through $L_7$, respectively—as a function of the DPCM error values of two neighbors of the current pel. As shown in FIG. 2, the two neighbors are, in this example, the pel which immediately precedes the current pel on the current line—referred to as "neighbor A"—and the pel which is directly above the current pel in the preceding line—referred to as "neighbor B." (Scanning is presumed to be top-to-bottom, left-to-right.)

Note that in Table I, there is a line of entries for each of the 49 possible neighbor states, i.e., for each of the 49 possible combinations of the values of neighbors A and B. More particularly, each line of the table shows the values of the two neighbors and the seven possible values of the current pel in order of decreasing frequency of occurrence in the above-mentioned representative ensemble of DPCM-encoded multilevel images. Thus, for example, line 6 of Table I shows that when neighbors A and B have the values $L_6$ and $L_1$, respectively, the most-frequently-occurring value for the current pel is $L_5$ which is assigned to codeword $W_1$; the second-most-frequently-occurring value for the current pel is $L_6$, which is assigned to codeword $W_2$, and so forth. Similarly for each other line of Table I, the current pel value which is the most frequently occurring, given the neighbor state, is always assigned to codeword $W_1$, the second most frequently occurring to codeword $W_2$, and so forth.

As further seen from Table I, the following seven codeword values have been assigned to the most-through least-frequently occurring pel values for each of the 49 combinations of neighbor values: 000, 001, 011, 111, 110, 100 and 010. This assignment scheme, in and of itself, will produce long runs of "0"s and at the same time, minimizes the likelihood of isolated "1"s in the bit stream. The desirability of the latter stems not only from the fact that the presence of short runs leads to inefficient run length coding, but also from the fact that the CCITT code in question assigns a relatively long variable-length codeword to runs comprised of a single "1". Moreover, in accordance with a feature of the invention, the average run length is increased, and the occurrence of isolated "1"s made even more infrequent, by complementing all the bits of a codeword if the last bit of the previously-generated codeword is a "1". Thus, for example, if the previously-generated codeword was 001 and Table I specifies that the next codeword to be generated is 000, the codeword 111 is generated instead. This approach has been found to provide a bit rate of about 2.05 bits/pel for an image having a theoretical minimum bit rate (entropy) of 1.84.

Returning, then, to intermediate coder 30 in FIG. 1, it is seen that the output of DPCM coder 20 is applied to serial-to-parallel converter 31. The output of the latter, which is a 3-bit word representing the value of the current pel, is applied to sample delay 32, whose output is a 3-bit word representing the value of neighbor A, and line delay 33, whose output is a 3-bit word representing the value of neighbor B. The outputs of delays 32 and 33, as well as the output of converter 31, are applied to read-only memory (ROM) 35, which provides at its output the appropriate 3-bit codeword specified in Table I. Moreover, in order to provide the above-described complementing, the three bits of the ROM output word are each extended to one input of a respective exclusive-OR gate 38. The other input for each exclusive-OR gate is the value of the last bit of the previously-generated codeword, which is provided via 1-bit delay unit 37. If that last bit was a "0", gates 38 pass the ROM output bits through to parallel-to-serial converter 39, and thus to CCITT coder 70, unchanged. If that last bit was a "1", gates 38 complement the ROM output bits before they are passed on.

Figure 3:
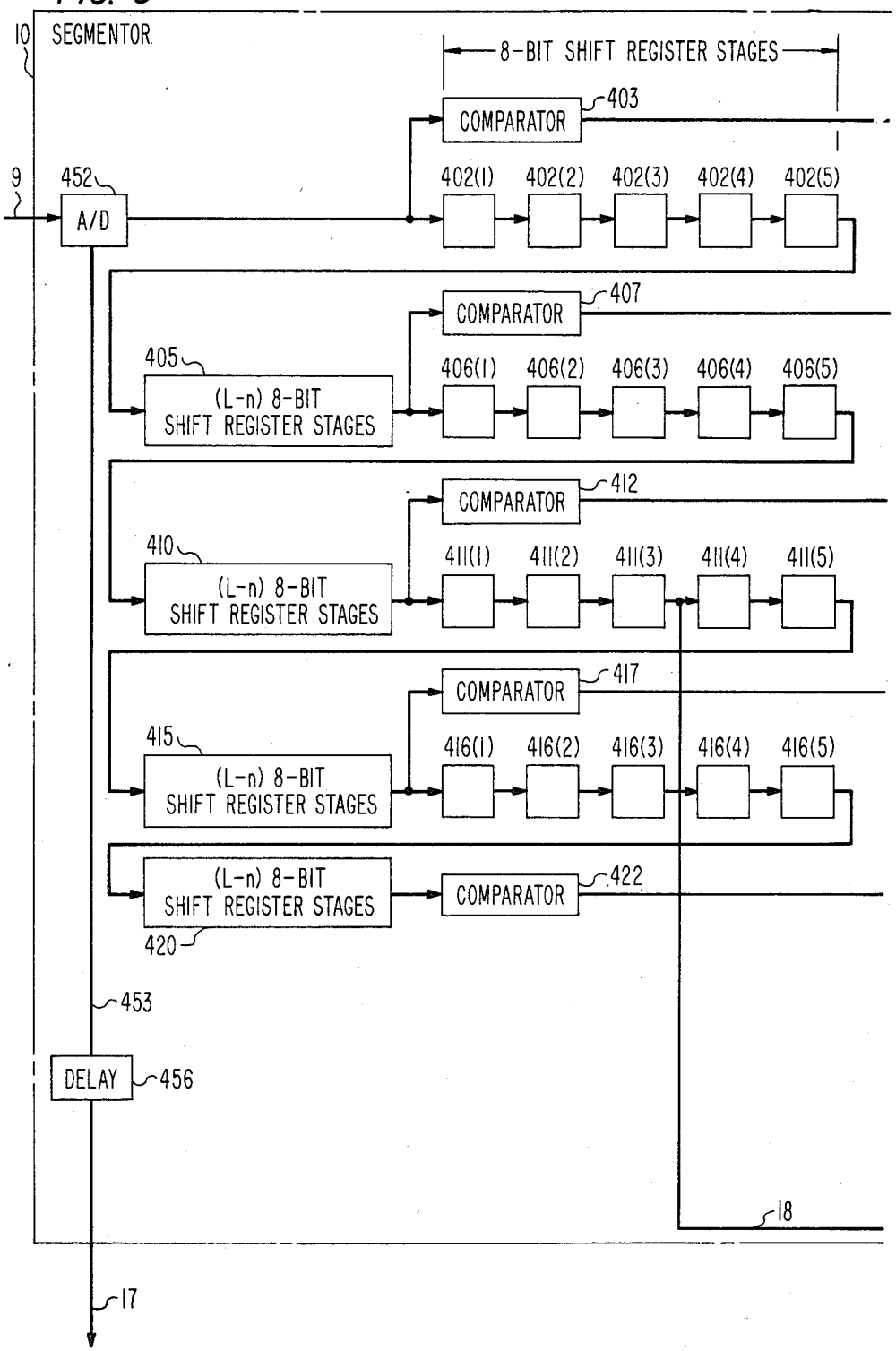

We turn now to FIGS. 3 and 4 which, when arranged as shown in FIG. 5, show the structure of segmentor 10.

Segmentor 10 uses three criteria to determine whether the current pel is from a bilevel region of the scanned image or a multilevel region.

The first criterion is based on the observation that the intensities, or values, of pels from bilevel regions of an image tend to be either greater than a particular upper threshold $t_1$ or less than a particular lower threshold $t_2$, i.e., they tend to have relatively high or relatively low intensities, while the intensities of pels from multilevel regions of an image tend to be between those thresholds. Thus if the value of the current pel is outside of (within) the range defined by those upper and lower thresholds, it is likely that that pel is from a bilevel (multilevel) region of the image.

The second criterion is based on the observation that if the values of a majority of pels in a window surrounding the current pel are outside of (within) the above-mentioned range, it is likely the current pel is from a bilevel (multilevel) region of the images. In the present illustrative embodiment, a 5-by-5 pel window is used, as shown in FIG. 2.

The third criterion is based on the observation that whatever type of region a pel comes from, it is likely that the next pel on the same line is from that same type of region.

As shown in the drawing, signals representing the above-described first, second and third criteria are provided to a voting circuit 440 on leads 441, 442 and 443, a "0" ("1") on a given one of these leads meaning that, from the standpoint of the criterion in question, the current pel is from a bilevel (multilevel) region of the image.

Within the voting circuit, leads 441 and 442 are applied to a first AND gate 444, leads 441 and 443 are applied to a second AND gate 445 and leads 442 and 443 are applied to a third AND gate 446. The outputs of the three AND gates are applied to OR gate 447. Thus, the output of the voting circuit is "0" ("1") if any two or more of leads 441, 442 and 443 carries a "0" ("1"), thereby providing on lead 12 a final decision that the current pel is from a bilevel (multilevel) region of the image.

More specifically, the analog scanned image signal from lead 9 is digitized and quantized within segmentor 10 by A/D converter 452. The latter applies the resulting pel values to a shift register structure comprised of 4L shift register stages, where L is the number of pels in each line of the scanned image. Each shift register stage is capable of holding one 8-bit quantized pel value. The drawing explicitly shown $n(n-1)=20$ of these stages—402(1) . . . 402(5), 406(1) . . . 506(5), 411(1) . . . 411(5) and 416(1) . . . 416(5)—n being the width (and height) of the above-mentioned window, i.e., n=5 in this embodiment. Each of these 20 stages holds the value of a respective pel within the first four lines of the window, the current pel being held by stage 411(3). The remainder of the stages are designated as 405, 410, 415 and 420, as shown in the drawing.

A/D converter 452 also provides pulses for incrementing pel counter 16 once per pel. These pulses are generated by the A/D converter on lead 453 beginning at the point in time that the analog signal is first applied to the A/D converter. In order to account for the two-line-plus-three-pel delay in delay stages 402(1)–402(5), 405, 406(1)–406(5), 410 and 411(1)–411(3), the pulses on lead 452 are appropriately delayed in a delay unit 456 prior to being applied to gel counter 16 via lead 17.

The pel values applied to stages 402(1), 406(1), 411(1) and 416(1) at any given time are also concurrently applied to comparators 403, 407, 412 and 417, respectively, and the output of the last one of stages 420 is applied to comparator 422. Each of comparators 403, 407, 412, 417 and 422 compares the applied gel value to the above-mentioned upper and lower thresholds $t_1$ and $t_2$—which illustratively have the values "28" and "195", respectively—and, in accordance with the first above-mentioned criterion, generates an "intensity range indication" having a value of "0" ("1"), indicating that that pel is in a bilevel (multilevel) region, if the pel value is outside of (within) the range defined by the thresholds.

The outputs of comparators 403, 407, 412, 417 and 422 are applied to respective shift registers comprising 1-bit shift register stages 404(1) . . . 404(5), 408(1) . . . 408(5), 413(1) . . . 413(5), 418(1) . . . 418(5) and 423(1) . . . 423(5), respectively. Each of these stages thus stores the intensity range indication for a respective pel in the window, with the intensity range indication for the current pel being stored in stage 413(3). In accordance with the above-mentioned first criterion, this indication is applied to voting circuit 440 over lead 441.

In accordance with the second criterion, it needs to be determined whether a majority of the intensity range indications for the current window are "0"s or "1"s. To this end, an accumulator 436 is provided to hold a number which is equal to the number of bits in the one-bit registers which hold a "1". This count is compared to "13" by a comparator 437. If it is less (greater) than "13", comparator generates a "0" ("1") on lead 442, thereby indicating that, from the standpoint of the second criterion, the current pel is from a bilevel (multilevel) region of the image.

The count in accumulator 436 is updated as follows: As each new pel is input to the segmentor, five pels leave the window. Their intensity range indications are shifted into auxiliary shift register stages 404(6), 408(6), 413(6), 418(6) and 423(6), respectively, from which they are applied to a ROM 433. The latter generates a 3-bit word indicating how many of the intensity range bits associated with the pels that just left the window are "1"s. At the same time, five new pels enter the window and are stored in stages 404(1), 408(1), 413(1), 418(1) and 423(1), respectively. The intensity range indications for these pels are applied to a ROM 431, which generates a 3-bit word indicating how many of the intensity range bits associated with the pels that just entered the window are "1"s. The output of ROM 433 is subtracted from the output of ROM 431 by a subtractor 434. The output of the latter, which represents the net change in the count of intensity range indications that are "1"s, is applied to accumulator 436 to update the count therein.

A signal representing the third criterion is simply a one-bit delayed version of the voting circuit output and is provided on lead 443 by one-bit-delay circuit 448 within voting circuit 440.

When the current pel is within three pels of an edge of the image, the circuitry just described will not necessarily provide the proper value for the signal on lead 442 because certain of the bits in the one-bit shift register stages will correspond to pels at the other side of the image. In addition, while the first several lines of the image are being scanned, a full window of pel values is simply not available. Such edge effects could be dealt with by making various modifications to the circuitry. These might include selectively clearing and/or ignoring the contents of certain ones of the one-bit shift register stages at appropriate points in the processing, providing a variable threshold for comparator 437, and/or freezing the output of comparator 437 at appropriate points in the processing. Alternatively, these edge effects can be ignored, since the adverse effect that they might have on coding efficiency will, in general, be negligible.

Figure 6:
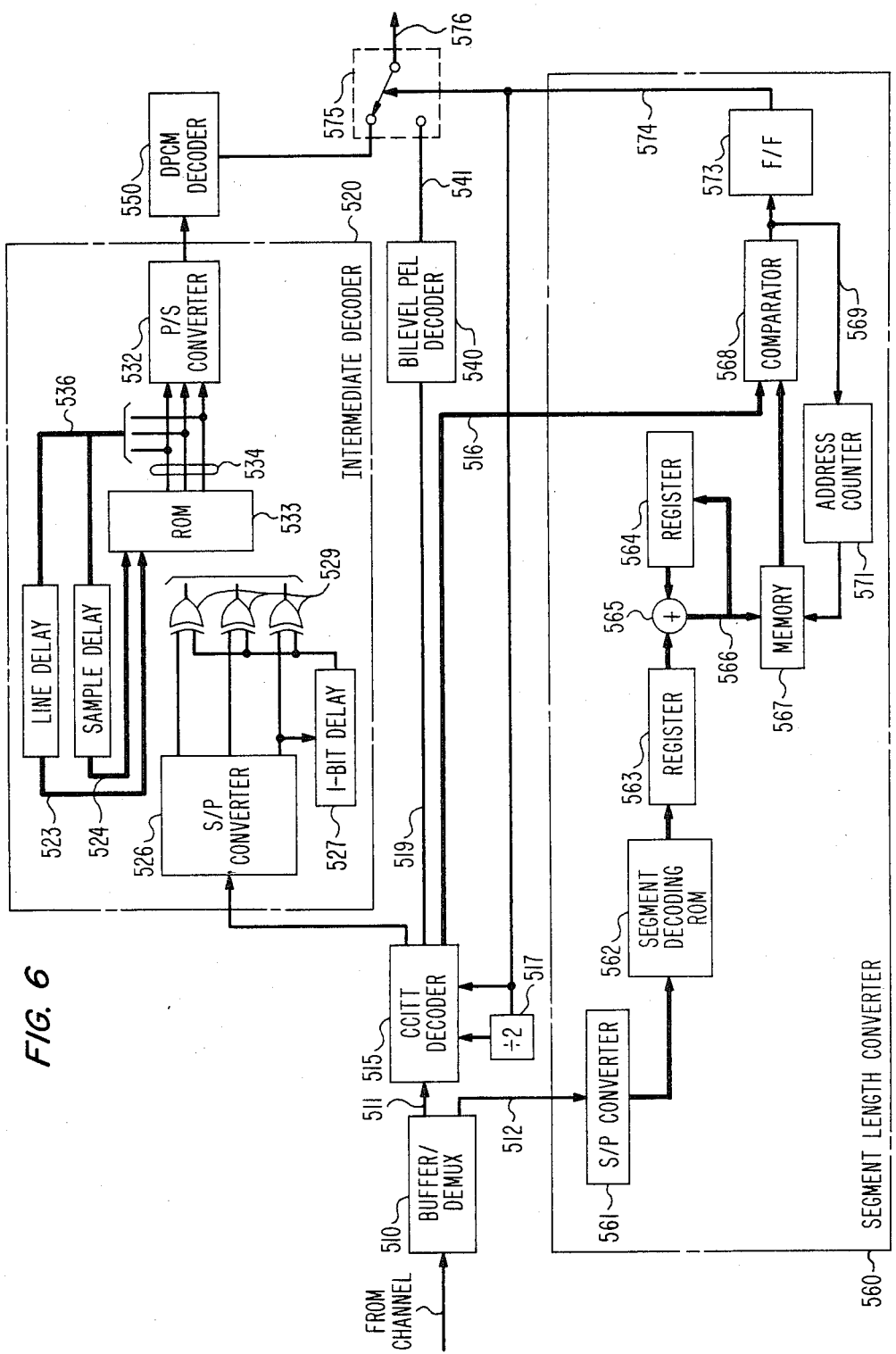
FIG. 6 is a block diagram of a receiver embodying the principles of the invention which processes the signal generated by the transmitter of FIG. 1.

We turn, now, to the receiver of FIG. 6. As shown therein, the encoded signal received from the transmission channel is applied within the receiver to buffer/demultiplexer 510. It will be recalled that the encoded segment lengths generated in the transmitter are transmitted ahead of the encoded image information for each line. Buffer/demultiplexer 510 provides these on its output lead 512 to segment length converter 560 and thereafter provides the encoded image information itself to CCITT decoder 515 on lead 511.

The function of segment length converter 560, more particularly, is to regenerate the addresses of the bilevel/multilevel and multilevel/bilevel transition points of each line, i.e., to regenerate the addresses that were sequentially stored in register 52 in the transmitter. To this end, the encoded segment lengths, which appear on lead 512 in serial form, are converted to parallel form by serial-to-parallel converter 561. They are then applied to segment decoding ROM 562, which performs the opposite function of segment coding ROM 55 in the transmitter, the output of ROM 562 thus being a sequence of words each representing a respective segment length generated by subtractor 54 in the transmitter.

As each segment length is generated, it is stored in parallel in/parallel out register 563 and added by an adder 565 to the address of the previous transition point within the line in question, which is held in a register 564. The output of adder 565 on cable 566 is thus the address of the next transition point in that line. This address is applied to register 564, where it supplants the address previously stored therein, and is also applied to a memory 567. Thus, after all the segment lengths on lead 512 have been processed, memory 567 holds the pel addresses of each bilevel/multilevel and multilevel/bilevel transition point for the line in question.

Thereafter, buffer/multiplexer 512 provides the encoded image information to CCITT decoder 515 via lead 511. As the latter proceeds with its processing of that information, it provides the current pel count to segment length converter 560 via cable 516. The latter extends within segment length converter 560 to comparator 568. Whenever the address currently being put out by memory 567 matches the current pel count, comparator 568 provides a pulse on its output lead 569. This triggers toggle flip-flop 573 from its current state to the other, thereby indicating to CCITT decoder 515 via lead 574 whether the current pel is from a bilevel or multilevel region of the image. Further, the output of divide-by-two circuit 517, which also receives its input from lead 574, indicates to CCITT decoder 515 the start of each multilevel region in just the same way that divide-by-two circuit 73 in the transmitter indicated this to CCITT coder 70. The signal on comparator output lead 569 is also applied to, and increments, a memory address counter 571, thereby causing the next address stored in memory 567 to be applied to comparator 568.

Whenever the current pel is from a bilevel region of the image, CCITT decoder 515 provides the bit indicating the current pel value to bilevel pel decoder 540 via lead 519. Bilevel pel decoder 540 responds by generating a word representing either the value "15" or the value "230", depending on whether the bit on lead 519 is a "0" or a "1". The output of bilevel pel decoder 540 extends via lead 541 to a switch 575, whose operation is controlled by the flip-flop output signal on lead 574. In particular, when the signal on lead 574 is such as to indicate that the curent pel is from a bilevel region of the image, switch 575 provides the output of bilevel pel decoder 540 as the receiver output on lead 576.

Whenever the current pel is from a multilevel region of the image, on the other hand, CCITT decoder 515 provides the 3-bit words representing the encoded DPCM error values to intermediate decoder 520, which performs the inverse function of intermediate coder 30 in the transmitter. In particular, the encoded DPCM errors, which appear on lead 518 in serial form, are converted to parallel form by serial-to-parallel converter 526. Each bit of the 3-bit output words of the latter is applied to one input of a respective one of exclusive-OR gates 529, while the other input for each of gates 529 is the least-significant bit of the previous output of converter 526, provided by 1-bit delay 527. If that bit was a "0", the output bits of converter 526 pass unchanged through to the outputs of gates 529. If that bit was a "1", the output bits of converter 526 are inverted at the gate outputs. This selective inversion of the bits of the encoded DPCM errors provides the inverse of the above-described complementing performed in the transmitter.

The three bits put out by exclusive-OR gates 529 serve as a portion of a 9-bit address provided to a ROM 533. Another three bits of that address, provided on cable 524, represent the DPCM error value of neighbor A (FIG. 2) of the current pel and the remaining three bits of that address, provided on cable 523, represent the DPCM error values of neighbor B. Given these inputs, ROM 533 is able to provide, in accordance with the assignment of Table I, the decoded 3-bit DPCM error value on its output leads 534. The DPCM error value on leads 534 is, in turn, provided in serial form to DPCM decoder 550 by parallel-to-serial converter 532 as the intermediate decoder output. The DPCM error value on leads 534 is also extended via cable 536 to line delay 523 and sample delay 524, the latter providing the values of neighbors B and A on cables 523 and 524, respectively, at the ROM input as described above. And at this time, the signal on lead 574 is operating switch 575 in such a way that the output of the receiver on lead 576 is taken from the output of the DPCM decoder.

If compatibility with existing CCITT recommendations is not a system requirement, it is not necessary to select the intermediate codeword values in such a way that long runs are provided. Rather, for example, a set of variable-length codewords can be arrived at for each different neighbor state using, for example, conventional Huffman coding techniques, with the pel values that are expected to occur most frequently, given the neighbor state, being assigned to the shortest codeword values. The variable length codewords are then directly transmitted over the channel. An example of such a scheme is shown in Table II.

TABLE II

| NEIGHBOR STATE | NEIGHBORS A | B | CODEWORDS | | | | | | |
|---|---|---|---|---|---|---|---|---|---|
| 1 | $L_1$ | $L_1$ | $L_1$ 1 | $L_2$ 01 | $L_3$ 001 | $L_4$ 00001 | $L_5$ 000001 | $L_6$ 000001 | $L_7$ 000000 |
| 2 | $L_1$ | $L_2$ | $L_1$ 0 | $L_2$ 11 | $L_3$ 101 | $L_4$ 1001 | $L_5$ 10001 | $L_7$ 100001 | $L_6$ 100000 |
| 3 | $L_1$ | $L_3$ | $L_1$ 0 | $L_3$ 11 | $L_2$ 101 | $L_5$ 1001 | $L_4$ 10001 | $L_6$ 100001 | $L_7$ 100000 |
| 4 | $L_1$ | $L_4$ | $L_2$ 11 | $L_1$ 10 | $L_4$ 01 | $L_3$ 001 | $L_7$ 0001 | $L_5$ 00001 | $L_6$ 00000 |
| 5 | $L_1$ | $L_5$ | $L_3$ 11 | $L_5$ 10 | $L_1$ 01 | $L_2$ 001 | $L_6$ 0001 | $L_4$ 00001 | $L_7$ 00000 |
| 6 | $L_1$ | $L_6$ | $L_5$ 1 | $L_6$ 01 | $L_3$ 0011 | $L_2$ 0010 | $L_7$ 0000 | $L_1$ 00011 | $L_4$ 00010 |
| 7 | $L_1$ | $L_7$ | $L_7$ 1 | $L_4$ 01 | $L_2$ 0011 | $L_6$ 0010 | $L_5$ 0000 | $L_3$ 00011 | $L_4$ 00010 |
| 8 | $L_2$ | $L_1$ | $L_1$ 0 | $L_3$ 11 | $L_2$ 101 | $L_6$ 1001 | $L_5$ 10001 | $L_7$ 100001 | $L_6$ 100000 |
| 9 | $L_2$ | $L_2$ | $L_1$ 0 | $L_2$ 11 | $L_3$ 101 | $L_4$ 1001 | $L_5$ 10001 | $L_7$ 100001 | $L_6$ 100000 |
| 10 | $L_2$ | $L_3$ | $L_3$ 0 | $L_1$ 11 | $L_2$ 101 | $L_5$ 1001 | $L_4$ 10001 | $L_6$ 100001 | $L_7$ 100000 |
| 11 | $L_2$ | $L_4$ | $L_2$ 11 | $L_4$ 10 | $L_1$ 01 | $L_3$ 001 | $L_7$ 0001 | $L_5$ 00001 | $L_6$ 00000 |
| 12 | $L_2$ | $L_5$ | $L_3$ 11 | $L_5$ 10 | $L_1$ 01 | $L_2$ 001 | $L_6$ 0001 | $L_4$ 00001 | $L_7$ 00000 |
| 13 | $L_2$ | $L_6$ | $L_6$ 0 | $L_5$ 01 | $L_7$ 0011 | $L_3$ 0010 | $L_4$ 0000 | $L_1$ 0011 | $L_2$ 00010 |
| 14 | $L_2$ | $L_7$ | $L_7$ 0 | $L_4$ 01 | $L_6$ 0011 | $L_7$ 0010 | $L_2$ 0000 | $L_3$ 0011 | $L_5$ 00010 |
| 15 | $L_3$ | $L_1$ | $L_1$ 0 | $L_2$ 11 | $L_3$ 101 | $L_4$ 1001 | $L_5$ 10001 | $L_6$ 100001 | $L_7$ 100000 |
| 16 | $L_3$ | $L_2$ | $L_1$ 0 | $L_2$ 11 | $L_3$ 101 | $L_4$ 1001 | $L_5$ 10001 | $L_7$ 100001 | $L_6$ 100000 |
| 17 | $L_3$ | $L_3$ | $L_1$ 0 | $L_3$ 11 | $L_2$ 101 | $L_5$ 1001 | $L_4$ 10001 | $L_6$ 100001 | $L_7$ 100000 |
| 18 | $L_3$ | $L_4$ | $L_2$ 0 | $L_1$ 11 | $L_4$ 101 | $L_3$ 1001 | $L_7$ 10001 | $L_5$ 100001 | $L_6$ 100000 |
| 19 | $L_3$ | $L_5$ | $L_3$ 11 | $L_1$ 10 | $L_5$ 01 | $L_2$ 001 | $L_6$ 0001 | $L_4$ 00001 | $L_7$ 00000 |
| 20 | $L_3$ | $L_6$ | $L_6$ 0 | $L_5$ 01 | $L_3$ 0011 | $L_2$ 0010 | $L_1$ 0000 | $L_7$ 00011 | $L_4$ 00010 |
| 21 | $L_3$ | $L_7$ | $L_7$ 0 | $L_6$ 111 | $L_4$ 110 | $L_3$ 100 | $L_2$ 1010 | $L_5$ 10111 | $L_1$ 10110 |
| 22 | $L_4$ | $L_1$ | $L_3$ 0 | $L_1$ 11 | $L_2$ 101 | $L_5$ 1001 | $L_4$ 10001 | $L_6$ 100001 | $L_6$ 100000 |
| 23 | $L_4$ | $L_2$ | $L_2$ 11 | $L_1$ 10 | $L_3$ 01 | $L_4$ 001 | $L_5$ 0001 | $L_7$ 00001 | $L_6$ 00000 |

TABLE II-continued

| NEIGHBOR STATE | NEIGHBORS A | B | CODEWORDS | | | | | | |
|---|---|---|---|---|---|---|---|---|---|
| 24 | $L_4$ | $L_3$ | $L_3$ 0 | $L_1$ 11 | $L_5$ 101 | $L_2$ 1001 | $L_4$ 10001 | $L_7$ 100001 | $L_6$ 100000 |
| 25 | $L_4$ | $L_4$ | $L_4$ 0 | $L_2$ 11 | $L_1$ 101 | $L_7$ 1001 | $L_3$ 10001 | $L_5$ 100001 | $L_6$ 100000 |
| 26 | $L_4$ | $L_5$ | $L_5$ 0 | $L_3$ 111 | $L_1$ 110 | $L_2$ 100 | $L_6$ 1010 | $L_4$ 10111 | $L_7$ 10110 |
| 27 | $L_4$ | $L_6$ | $L_6$ 11 | $L_7$ 10 | $L_5$ 01 | $L_4$ 001 | $L_2$ 0001 | $L_1$ 00001 | $L_3$ 00000 |
| 28 | $L_4$ | $L_7$ | $L_7$ 0 | $L_4$ 11 | $L_2$ 101 | $L_3$ 1001 | $L_6$ 10001 | $L_1$ 100001 | $L_5$ 100000 |
| 29 | $L_5$ | $L_1$ | $L_2$ 11 | $L_1$ 10 | $L_3$ 01 | $L_5$ 001 | $L_4$ 0001 | $L_6$ 00001 | $L_7$ 00000 |
| 30 | $L_5$ | $L_2$ | $L_2$ 0 | $L_1$ 111 | $L_4$ 110 | $L_3$ 100 | $L_5$ 1010 | $L_6$ 10111 | $L_7$ 10110 |
| 31 | $L_5$ | $L_3$ | $L_3$ 11 | $L_1$ 10 | $L_2$ 01 | $L_5$ 001 | $L_4$ 0001 | $L_6$ 00001 | $L_7$ 00000 |
| 32 | $L_5$ | $L_4$ | $L_4$ 11 | $L_2$ 10 | $L_7$ 01 | $L_1$ 001 | $L_3$ 0001 | $L_5$ 00001 | $L_6$ 00000 |
| 33 | $L_5$ | $L_5$ | $L_5$ 11 | $L_3$ 10 | $L_6$ 01 | $L_1$ 001 | $L_2$ 0001 | $L_4$ 00001 | $L_7$ 00000 |
| 34 | $L_5$ | $L_6$ | $L_6$ 0 | $L_5$ 11 | $L_3$ 101 | $L_1$ 1001 | $L_2$ 10001 | $L_7$ 100001 | $L_4$ 100000 |
| 35 | $L_5$ | $L_7$ | $L_6$ 0 | $L_7$ 11 | $L_4$ 101 | $L_5$ 1001 | $L_2$ 10001 | $L_1$ 100001 | $L_3$ 100000 |
| 36 | $L_6$ | $L_1$ | $L_1$ 11 | $L_6$ 10 | $L_7$ 011 | $L_3$ 010 | $L_2$ 000 | $L_5$ 0011 | $L_4$ 0010 |
| 37 | $L_6$ | $L_2$ | $L_6$ 11 | $L_7$ 01 | $L_2$ 00 | $L_4$ 1011 | $L_5$ 1010 | $L_1$ 1001 | $L_3$ 1000 |
| 38 | $L_6$ | $L_3$ | $L_1$ 0 | $L_6$ 110 | $L_2$ 101 | $L_3$ 1111 | $L_5$ 1110 | $L_7$ 1001 | $L_4$ 1000 |
| 39 | $L_6$ | $L_4$ | $L_7$ 11 | $L_6$ 10 | $L_4$ 01 | $L_2$ 001 | $L_1$ 0001 | $L_3$ 00001 | $L_5$ 00000 |
| 40 | $L_6$ | $L_5$ | $L_5$ 11 | $L_6$ 10 | $L_3$ 01 | $L_1$ 001 | $L_2$ 0001 | $L_4$ 00001 | $L_7$ 00000 |
| 41 | $L_6$ | $L_6$ | $L_6$ 1 | $L_5$ 01 | $L_3$ 0011 | $L_7$ 0010 | $L_1$ 0000 | $L_4$ 00011 | $L_2$ 00010 |
| 42 | $L_6$ | $L_7$ | $L_6$ 0 | $L_7$ 11 | $L_5$ 101 | $L_4$ 1001 | $L_2$ 10001 | $L_3$ 100001 | $L_1$ 100000 |
| 43 | $L_7$ | $L_1$ | $L_7$ 0 | $L_5$ 110 | $L_3$ 101 | $L_4$ 1111 | $L_6$ 1110 | $L_2$ 1001 | $L_1$ 1000 |
| 44 | $L_7$ | $L_2$ | $L_7$ 11 | $L_2$ 10 | $L_3$ 011 | $L_4$ 010 | $L_1$ 000 | $L_5$ 0011 | $L_6$ 0010 |
| 45 | $L_7$ | $L_3$ | $L_7$ 0 | $L_5$ 111 | $L_6$ 110 | $L_4$ 100 | $L_3$ 1010 | $L_1$ 10111 | $L_2$ 10110 |
| 46 | $L_7$ | $L_4$ | $L_4$ 11 | $L_7$ 10 | $L_2$ 01 | $L_3$ 001 | $L_1$ 0001 | $L_6$ 00001 | $L_5$ 00000 |
| 47 | $L_7$ | $L_5$ | $L_7$ 11 | $L_6$ 10 | $L_5$ 011 | $L_3$ 010 | $L_4$ 000 | $L_2$ 0011 | $L_1$ 0010 |
| 48 | $L_7$ | $L_6$ | $L_7$ 1 | $L_6$ 01 | $L_4$ 000 | $L_5$ 00111 | $L_3$ 00110 | $L_2$ 00101 | $L_1$ 00100 |
| 49 | $L_7$ | $L_7$ | $L_7$ 1 | $L_4$ 01 | $L_2$ 000 | $L_1$ 00111 | $L_3$ 00110 | $L_6$ 00101 | $L_5$ 00100 |

Note that in contrast to the scheme of Table I, not only are the intermediate codewords of variable length, but also various different sets of codewords are used for different neighbor states, this being a function of the relative frequency of occurrence of the seven possible pel values for the neighbor state in question. In this example there are eight different sets of variable length codewords.

A transmitter and receiver implementing the scheme of Table II are shown in FIGS. 7 and 8, respectively. In FIG. 7, in particular, the analog scanned image signal is received on lead 701. This signal is assumed to represent an image which is only multilevel. The transmitter thus does not include a segmentor. Rather, the received signal is directly applied to DPCM encoder 702, which generates 3-bit DPCM words in serial form on its output lead 703. Serial-to-parallel converter 705 then provides the three bits of each DPCM word in parallel form on cable 706. The latter extends to line delay 711 and sample delay 712, the outputs of which are the values of neighbor B and neighbor A, respectively. These values, along with the current pel value on cable 706, comprise the inputs for a ROM 715.

ROM 715 has two outputs. A first output, on cable 716, indicates which of the eight sets of variable length code words from Table II is to be used, this being a function of the neighbor state, i.e., the values of neighbors A and B. The other output, on cable 717, indicates whether the current pel value is the one that is expected to occur most frequently, second most frequently, etc., given the neighbor state, as set forth in Table II. Cables 716 and 717 extend to transcoder 720. The latter, which illustratively is of the type conventionally used in variable length coding arrangements, uses the information on cables 716 and 717 to provide the bits of the appropriate variable length codeword in serial form on lead 721. These are applied to a buffer 725 and thence to the channel.

In the receiver of FIG. 8, the transmitted variable length codewords are received from the channel on lead 801 and applied to a buffer 802. From there they are applied to transcoder 805 via lead 803. The transcoder also receives a signal on cable 811 indicating which of the eight sets of variable length codewords is applicable to the codeword just received from lead 803. Based on these inputs, transcoder 805 determines whether the current pel value is the one that is expected to occur most frequently, second most frequently, etc., given the neighbor state, and an indication of same is passed to ROM 810 via cable 806. The values of neibhbors A and B are also provided to the ROM—on cables 819 and 818, respectively—and based on these inputs, ROM 810 provides on its output cable 812 the appropriate DPCM codeword value as specified in Table II.

The bits of the DPCM codeword on cable 812 are provided in serial form to DPCM decoder 825 via parallel-to-serial converter 820 and lead 821. They are also provided in parallel form to sample delay 817 and line delay 816, the outputs of which are the aforementioned values of neighbors A and B on cables 819 and 818, respectively. The output of DPCM decoder 825, which serves as the receiver output signal, is the recovered version of the analog scanned image signal that was applied to the transmitter.

The foregoing merely illustrates the principles of the invention. For example, the invention is not limited to the encoding of DPCM errors but, rather, can be used to encode various types of image signals, e.g., PCM signals. In particular, I have discovered that variable-length coding of 4-bit PCM words in accordance with the invention provides an even better bit rate than variable-length coding of 3-bit DPCM errors, as described above in conjunction with the embodiment of FIGS. 7-8. As a further possibility, the invention can be used in conjunction with the order statistics matching technique described in the copending, commonly assigned patent application of T. L. Lim et al, Serial No. 495,707 filed May 18, 1983, although we have found that the added improvement afforded by the inclusion of that technique is quite small.

Moreover, the invention is not limited to any particular circuit implementation for any of the components of the system in which the invention is used. Thus, for example, although various components in the disclosed embodiments are shown as distinct physical elements, the individual or combined functions of any one or more of them could be performed by one or more appropriately programmed processors. It will thus be appreciated that those skilled in the art will be able to devise numerous arrangements which, although not explicitly set forth herein, embody the principles of the invention.

What is claimed is:

1. Apparatus comprising,
   means for receiving a stream of values associated with respective pels of an image,
   means for generating a stream of codewords in response to said stream of values, said means for generating including means for generating a codeword for each pel as a function of the frequency with which the value associated with that pel is expected to occur, given the values associated with predetermined ones of its neighbors,
   the codeword generated for at least ones of the pels whose associated value is the most frequently expected to occur, given the values associated with its said neighbors, being a first binary word all of whose bits have a first predetermined value, and
   the codeword generated for at least ones of the pels whose associated value is the second most frequently expected to occur, given the values associated with its said neighbors, being a second binary word a selected one of whose first and last bits has a second predetermined value and the others of whose bits have said first value.

2. The invention of claim 1 wherein the codeword generated for others of the pels whose associated value is the most frequently expected to occur, given the values associated with its said neighbors, is the complement of said first binary word when the last bit of the previously generated codeword has said second value and wherein the codeword generated for others of the pels whose associated value is the second most frequently expected to occur, given the values associated with its said neighbors, is the complement of said second binary word when the last bit of the previously generated codeword has said second value.

3. Apparatus comprising,
   means for receiving a stream of values associated with respective pels of an image, and
   means for generating a stream of codewords in response to said stream of values, said means for generating including means for generating a codeword for each pel as a function of the frequency with which the value associated with that pel is expected to occur, given the values associated with predetermined ones of its neighbors,
   the codeword generated to represent at least ones of the pels whose associated value is the most frequently expected to occur, given the values associated with its said neighbors, being a binary word all of whose bits have a first predetermined value when the last bit of the previously generated codeword has said first value and all of whose bits have a second predetermined value when the last bit of the previously generated code word has said second value.

4. Apparatus comprising
   means for receiving a signal representing a plurality of pels of an image each having a particular one of a predetermined plurality of associated values, and
   means for generating in response to said signal a codeword to represent each of sad pels, including means for generating said codeword as a function of said one value and of an expected set of order statistics for said predetermined plurality of values, said expected set of order statistics being the expected frequency of occurrence of said one value given the values associated with predetermined ones of the neighbors of said each pel in said image.

5. The invention of claim 4 wherein the codeword generated to represent at least ones of the pels whose associated value is the most frequently expected to occur, given the values of its said neighbors, is a first binary word all of whose bits have a first predetermined value.

6. The invention of claim 5 wherein the codeword generated to represent at least ones of the pels whose associated value is the second most frequently expected to occur, given the values of its said neighbors, is a second binary word a selected one of whose first and last bits has a second predetermined value and the others of whose bits have said first value.

7. The invention of claim 4 wherein the codeword generated to represent at least ones of said pels each of whose associated value is the most frequently expected to occur, given said values of said neighbors, is a binary word all of whose bits have a first predetermined value when the last bit of the previously generated codeword has said first value and all of whose bits have a second predetermined value when the last bit of the previously generated codeword has said second value.

8. Apparatus comprising
means for receiving a stream of values associated with respective pels in an image, each said pel having a selected plurality of neighbors and each said neighbor having a predetermined spatial relationship to said each pel, and
means for generating a stream of codewords in response to said stream of values including means for generating the $i^{th}$ of an ordered plurality of $n > 2$ predetermined codewords to represent each of at least ones of said pels whose associated value is the $i^{th}$ most-frequently-expected-to-occur value for pels whose neighbors have the same values as the neighbors of said each pel.

9. The invention of claim 8 wherein the values associated with said pels are represented as respective binary words, wherein said codewords are binary words and wherein the values of said codewords are such that said stream of codewords has a greater average bit run length than said stream of said associated pel values.

10. The invention of claim 8 wherein the first of said codewords is comprised of a predetermined number of bits all of which have a first predetermined value.

11. The invention of claim 10 wherein the second of said codewords is comprised of said predetermined number of bits, a selected one of the first and last of the bits in said second codeword having a second predetermined value and all of the other of those bits having said first value.

12. The invention of claim 8 wherein the first of said codewords is a binary word all of whose bits have a first predetermined value when the last bit of the previously generated codeword has said first value and all of whose bits have a second predetermined value when the last bit of the previously generated codeword has said second value.

13. The invention of claim 8 further comprising means for generating the complement of said $i^{th}$ codeword to represent each of others of said pels whose associated value is the $i^{th}$ most-frequently-expected-to-occur when the last bit of the previously generated codeword has said second value.

14. Apparatus comprising
means for receiving a stream of values associated with respective pels of an image, each said pel having a selected plurality of neighbors and each said neighbor having a predetermined spatial relationship to said each pel, and
means for generating a stream of codewords in response to said stream of values including means for generating the $i^{th}$ variable length codeword of a particular one of a plurality of sets of $n \leq 2$ variable length codewords, said one set being associated with the values associated with said neighbors of said each pel, to represent each pel whose associated value is the $i^{th}$ most-frequently-expected-to-occur value for pels whose neighbors have the same values as the neighbors of said each pel.

15. A method for generating a stream of codewords in response to a stream of values associated with respective pels of an image, said method comprising the step of
generating a codeword for each pel as a function of the frequency with which the value associated with that pel is expected to occur, given the values associated with predetermined ones of its neighbors,
the codeword generated for at least ones of the pels whose associated value is the most frequently expected to occur, given the values associated with its said neighbors, being a first binary word all of whose bits have a first predetermined value, and the codeword generated for at least ones of the pels whose associated value is the second most frequently expected to occur, given the values associated with its said neighbors, being a second binary word a selected one of whose first and last bits has a second predetermined value and the others of whose bits have said first value.

16. The invention of claim 15 wherein the codeword generated for others of the pels whose associated value is the most frequently expected to occur, given the values associated with its said neighbors, is the complement of said first binary word when the last bit of the previously generated codeword has said second value and wherein the codeword generated for others of the pels whose associated value is the second most frequently expected to occur, given the values associated with its said neighbors, is the complement of said second binary word when the last bit of the previously generated codeword has said second value.

17. A method for generating a stream of codewords in response to a stream of values associated with respective pels of an image, said method comprising the step of
generating a codeword for each pel as a function of the frequency with which the value associated with that pel is expected to occur, given the values associated with predetermined ones of its neighbors,
the codeword generated to represent at least ones of the pels whose associated value is the most frequently expected to occur, given the values associated with its said neighbors, being a binary word all of whose bits have a first predetermined value when the last bit of the previously generated codeword has said first value and all of whose bits have a second predetermined value when the last bit of the previously generated codeword has said second value.

18. A method of generating a codeword to represent each of a plurality of pels of an image, said each pel having a particular one of a predetermined plurality of associated values, said method comprising the step of
generating said codeword as a function of said one value and of an expected set of order statistics for said predetermined plurality of values, said expected set of order statistics being the expected frequency of occurrence of said one value given the values associated with predetermined ones of the neighbors of said each pel in said image.

19. The invention of claim 18 wherein the codeword generated to represent at least ones of the pels whose associated value is the most frequently expected to occur, given the values of its said neighbors, is a first binary word all of whose bits have a first predetermined value.

20. The invention of claim 19 wherein the codeword generated to represent at least ones of the pels whose associated value is the second most frequently expected to occur, given the values of its said neighbors, is a second binary word a selected one of whose first and last bits has a second predetermined value and the others of whose bits have said first value.

21. The invention of claim 18 wherein the codeword generated to represent at least ones of said pels each of whose associated value is the most frequently expected to occur, given said values of said neighbors, is a binary word all of whose bits have a first predetermined value when the last bit of the previously generated codeword has said first value and all of whose bits have a second predetermined value when the last bit of the previously generated codeword has said second value.

22. A method of generating a stream of codewords in response to a stream of values associated with respective pels in an image, each said pel having a selected plurality of neighbors and each said neighbor having a predetermined spatial relationship to said each pel, said method comprising the step of generating the $i^{th}$ of an ordered plurality of $n>2$ predetermined codewords to represent each of at least ones of said pels whose associated value is the $i^{th}$ most-frequently-expected-to-occur value for pels whose neighbors have the same values as the neighbors of said each pel.

23. The invention of claim 22 wherein the values associated with said pels are represented as respective binary words, wherein said codewords are binary words and wherein the values of said codewords are such that said stream of codewords has a greater average bit run length than said stream of said associated pel values.

24. The invention of claim 22 wherein the first of said codewords is comprised of a predetermined number of bits all of which have a first predetermined value.

25. The invention of claim 24 wherein the second of said codewords is comprised of said predetermined number of bits, a selected one of the first and last of the bits in said second codeword having a second predetermined value and all of the other of those bits having said first value.

26. The invention of claim 22 wherein the first of said codewords is a binary word all of whose bits have a first predetermined value when the last bit of the previously generated codeword has said first value and all of whose bits have a second predetermined value when the last bit of the previously generated codeword has said second value.

27. The invention of claim 22 comprising the further step of generating the complement of said $i^{th}$ codeword to represent each of others of said pels whose associated value is the $i^{th}$ most-frequently-expected-to-occur, this step being performed when the last bit of the previously generated codeword has said second value.

28. A method of generating a stream of codewords in response to a stream of values associated with respective pels in an image, each pel having a selected plurality of neighbors, each said neighbor having a predetermined spatial relationship to said each pel, said method comprising the step of generating the $i^{th}$ variable length codeword of a particular one of a plurality of sets of $n>2$ variable length codewords, said one set being associated with the values associated with said neighbors of said each pel, to represent each pel whose associated value is the $i^{th}$ most-frequently-expected-to-occur value for pels whose neighbors have the same values as the neighbors of said each pel.

* * * * *

UNITED STATES PATENT AND TRADEMARK OFFICE
CERTIFICATE OF CORRECTION

PATENT NO. : 4,578,704

DATED : March 25, 1986

INVENTOR(S) : Hamid Gharavi

It is certified that error appears in the above-identified patent and that said Letters Patent is hereby corrected as shown below:

Column 1, line 7, "In is" should read --It is--. Column 2, line 27, "imge" should read --image--. Column 6, line 45, "506(5)" should read --406(5)--; line 67, "gel" should read --pel--. Column 13, line 8, "neibh-" should read --neigh---. Column 15, line 56, "$n \leq 2$" should read --$n > 2$--.

Signed and Sealed this

Twenty-third Day of September 1986

[SEAL]

*Attest:*

DONALD J. QUIGG

*Attesting Officer*    *Commissioner of Patents and Trademarks*